US011835425B2

(12) United States Patent
Olbrich et al.

(10) Patent No.: US 11,835,425 B2
(45) Date of Patent: Dec. 5, 2023

(54) METHOD AND SYSTEM FOR EVALUATING A STRUCTURAL INTEGRITY OF AN AERIAL VEHICLE

(71) Applicant: Ostbayerische Technische Hochschule Regensburg, Regensburg (DE)

(72) Inventors: Florian Olbrich, Pettendorf (DE); Christian Pongratz, Regensburg (DE); Rudolf Bierl, Regensburg (DE); Ingo Ehrlich, Geisenfeld (DE)

(73) Assignee: Ostbayerische Technische Hochschule Regensburg, Regensburg (DE)

( * ) Notice: Subject to any disclaimer, the term of this patent is extended or adjusted under 35 U.S.C. 154(b) by 73 days.

(21) Appl. No.: 17/615,128

(22) PCT Filed: Jun. 4, 2020

(86) PCT No.: PCT/EP2020/065540
§ 371 (c)(1),
(2) Date: Nov. 30, 2021

(87) PCT Pub. No.: WO2020/245305
PCT Pub. Date: Dec. 10, 2020

(65) Prior Publication Data
US 2022/0228946 A1 Jul. 21, 2022

(30) Foreign Application Priority Data
Jun. 7, 2019 (EP) ...................................... 19179054

(51) Int. Cl.
*G01M 5/00* (2006.01)
*B64F 5/60* (2017.01)
(52) U.S. Cl.
CPC ............. *G01M 5/0033* (2013.01); *B64F 5/60* (2017.01); *G01M 5/0066* (2013.01)

(58) Field of Classification Search
None
See application file for complete search history.

(56) References Cited

U.S. PATENT DOCUMENTS

| 4,480,480 A | * | 11/1984 | Scott | ................... | G01M 5/0033 |
| | | | | | 702/41 |
| 5,327,358 A | * | 7/1994 | Stubbs | ................ | G01M 5/0066 |
| | | | | | 702/36 |

(Continued)

FOREIGN PATENT DOCUMENTS

| DE | 10 2005 052 644 A1 | 5/2007 |
| EP | 3 284 671 A1 | 2/2018 |
| EP | 3284671 A1 * | 2/2018 | ............. B64C 27/12 |

OTHER PUBLICATIONS

Gibson, Ronald F., "Modal Vibration response measurements for characterization of composite materials and structures," Composites Science and Technology, vol. 60 (2000), pp. 2769-2780, DOI: 10.1016/S0266-3538(00)00092-0.

(Continued)

*Primary Examiner* — Raul J Rios Russo
*Assistant Examiner* — Carl F. R. Tchatchouang

(57) ABSTRACT

A method of evaluating a structural integrity of an aerial vehicle comprising one or more engines comprises selectively driving said engine/s of said aerial vehicle according to a driving pattern unsuitable to put or maintain the aerial vehicle in flight, recording a vibrational response of at least a part of the aerial vehicle to said selective driving of said engine/s, determining a plurality of modal parameters of said vibrational response, in particular an eigenfrequency of said vibrational response and/or a damping factor corresponding to said eigenfrequency, and classifying said structural integrity based on a deviation of said plurality of modal parameters from baseline modal parameters for said aerial vehicle.

18 Claims, 4 Drawing Sheets

(56) References Cited

U.S. PATENT DOCUMENTS

| | | | |
|---|---|---|---|
| 5,814,729 | A | 9/1998 | Wu et al. |
| 8,151,643 | B2 | 4/2012 | De Smet |
| 2008/0179993 | A1* | 7/2008 | Sanderson ......... G01N 29/2475 310/319 |
| 2009/0216398 | A1* | 8/2009 | Lynch ................ G01M 7/025 701/29.5 |
| 2014/0053649 | A1* | 2/2014 | Maalioune ......... G01N 29/4445 73/583 |

OTHER PUBLICATIONS

Mook, Gerhard et al., "Konversion von Lambwellenmoden in CFK-Platten," Conference: DACH-Tagung der Deutschen, Österreichischen und Schweizerischen Gesellschaft für Zerstürungsfreie Prüfung, Sep. 17-19, 2012 Graz, Mo.3.C.2, 9 pages, ISBN: 978-3-940283-44-3, (*with English translation*).

Pfleiderer, Klaus, "Frequenzkonversion aufgrund nichtlinearer akustischer Phänomene: Grundlagen und Anwendung zur defektselektiven zerstörungsfreien Prüfung," (2006), 121 pages, DOI:10.18419/OPUS-1707, (*In German with English abstract on pages 12-13*).

Su, Zhongqing et al., "Identification of Damage Using Lamb Waves: From Fundamentals to Applications," Lecture Notes in Applied and Computational Mechanics vol. 48, (2009), 354 pages, DOI: 10.1007/978-1-84882-784-4.

Wahab, Mohamad Abdel et al., "Analysis of the dynamic behavior of composite plates subjected to impact," Mechanics & Industgy, vol. 17, No. 414 (2016), 8 pages.

Zou, Y. et al., "Vibration-Based Model-Dependent Damage (Delamination) Identification and Health Monitoring for Composite Structures—A Review," Journal of Sound and Vibration, vol. 230, No. 2, (2000), pp. 357-378, DOI: 10.1006/jsvi.1999.2624.

European Patent Office, International Search Report and Written Opinion of the International Searching Authority, Application No. PCT/EP2020/065540, dated Aug. 26, 2020, 16 pages.

Paul D. Samuel et al., *A review of vibration-based techniques for helicopter transmission diagnostics*, Journal of Sound and Vibration vol. 282, No. 1-2, Apr. 6, 2005, pp. 475-508, XP004781904, DOI: 10.1016/J.JSV.2004.02.058.

\* cited by examiner

METHOD AND SYSTEM FOR EVALUATING A STRUCTURAL INTEGRITY OF AN AERIAL VEHICLE

CROSS-REFERENCE TO RELATED APPLICATIONS

This application is the national phase entry of International Patent Application No. PCT/EP2020/065540 filed on Jun. 4, 2020, and claims the benefit of European Patent Application No. 19179054.2 filed Jun. 7, 2019, then disclosures of which are incorporated herein by reference in their entirety.

FIELD OF THE INVENTION

The present invention is in the field of detection of structural failure in aerial vehicles. More precisely, the present invention relates to the evaluation of the structural integrity of the components of an aerial vehicle based on their vibrational response to an applied vibrational stimulus.

BACKGROUND

Aerial vehicles require lightweight and at the same time sturdy materials as part of their construction to deliver both fuel economy and passenger/cargo safety. This compromise regularly necessitates the use of composite materials in the loadbearing elements of the structure. However, composite materials exhibit complex failure modes while structural failure in aircraft components can have severe consequences. Therefore, structural integrity monitoring is commonly performed in the aviation sector as part of inline fabrication processes and routine inspection to prevent material failure in the construction as a result of accumulated structural defects.

Currently available non-destructive evaluation (NDE) methods comprise visual inspection or localized detection techniques commonly using external and static inspection devices, such as magnetic field based inspection methods, radiographs, eddy-current based methods and thermal field based methods.

Another potential investigation method for monitoring the structural integrity relates to the analysis of vibrations of the material in response to an applied external stimulus for localized measurements. For example and as described by U.S. Pat. No. 5,814,729, piezoelectric actuators on an investigated hull part may be used to generate structural waves, e.g. Lamb waves, whose propagation can be probed by sensors attached to a plurality of sites in the vicinity of the actuators. The characteristics of the transmitted waves can then be investigated to detect potential material defects. However, this method regularly requires a large amount of sensors and actuators distributed throughout the aerial vehicle, since non-defective material joints and bends act as scattering centers for the excited waves, and non-continuous parts of the aerial vehicle therefore usually require individual sensors and actuators.

U.S. Pat. No. 8,151,643 B2 teaches providing specifically designed flexible microsensors to detect abnormal vibrations in an aircraft structure while the aircraft is in flight at different points of a surface of the structure. During flight, the aircraft structure is excited to vibrate from a plurality of energy sources, and these vibrations may be detected with the sensors. Abnormal vibrations may then be identified using a frequency analysis of the vibratory response of the structure due to the several vibration excitations by determining an appearance of additional lines in a frequency spectrum, different amplitudes and/or frequencies of resonant lines.

DE 10 2005 052 644 A1 teaches to distribute vibration microsensors over the hull of an aircraft to respond to in-flight vibrations caused by a broadband excitation from the engines and the airstream. The response of the microsensors is analyzed to detect frequency overlaps due to a frequency shift of a mode or the occurrence of additional harmonic frequencies before the potential appearance of catastrophic fluttering.

EP 3284671 A1 discloses a diagnostic method for a rotorcraft drive system. The associated diagnostic system includes a tachometer and a vibration sensor coupled to the drive train. The tachometer is used to detect a rotation speed of a rotating component. The rotation frequency and the vibration signal are sampled during operation of the rotorcraft and used to generate a time synchronous average vibration signal. The diagnostic system therefrom infers unhealthy components of the drive train. If an unhealthy component is identified during flight, the cabin crew may be notified in order to adjust the aircraft speed or operational parameters in order to reduce the likelihood of catastrophic failure during flight.

US 2014/0053649 A1 discloses a monitoring unit and corresponding method for detecting structural defects in aircraft nacelle during use. In order to avoid a risk of breakage in connection links to monitoring sensors, electrically autonomous sensors are mounted in the aircraft nacelle able to wirelessly communicate with calculation units. These electrically autonomous sensors comprise MEMS devices which convert mechanical energy into electrical energy to provide the sensors with electricity when the aircraft is operating.

US 2009/90216398 A1 discloses a vehicle health and usage monitoring system and corresponding method for a helicopter. In this system, a series of accelerometers are placed on various components of the engine and drive system to gather vibration data which data may be analyzed after flight. In order to avoid complex through-bulkhead connectors for the sensor wires, wireless sensor systems are proposed which relay real-time health and/or usage data to a centralized system. As such wireless systems need to operate autonomously, the power demand of the sensors is managed by additional wake-up circuitry which triggers data collection based on the occurrence of a vibration signal at the operation vibration frequency.

SUMMARY OF THE INVENTION

The inventors identified that a largely neglected but growing field of technology in the context of structural integrity monitoring however relates to smaller and currently mostly unmanned aerial vehicles, such as electrically propelled aerial vehicles, e.g. drones or personal aircraft propelled by electric motors. For these aerial vehicles, the commonly used damage detection techniques for aircraft are economically not viable or even unsuitable due to these smaller aerial vehicles' compact construction with an emphasis on composite materials and an increased sensitivity to additional weight of incorporated actuation and monitoring systems. Moreover, the employed materials and common speeds of smaller aerial vehicles usually prevent an investigation of flutter modes, which in these aerial vehicles may appear only at an advanced stage of structural failure. These smaller aerial vehicles are therefore usually only visually inspected or solely examined with external investigation methods at the production stage and are generally not equipped with elaborate integral damage detection systems.

In view of this state-of-the-art, the object of the invention is to provide an effective evaluation system for the structural integrity of a small aerial vehicle whose components can be incorporated into the aerial vehicle with limited additional weight, cost and complexity.

This object is solved by a method, a system and a computer program for evaluating a structural integrity of an aerial vehicle according to the independent claims. The dependent claims relate to preferred embodiments.

According to a first aspect, the invention relates to a method of evaluating a structural integrity of an aerial vehicle comprising one or more engines. The method comprises selectively driving said engine/s of said aerial vehicle according to a driving pattern unsuitable to put or maintain the aerial vehicle in flight. The method further comprises recording a vibrational response of at least a part of the aerial vehicle to said selective driving of said engine/s and determining a plurality of modal parameters of said vibrational response, in particular an eigenfrequency of said vibrational response and/or a damping factor corresponding to said eigenfrequency. The method also comprises classifying said structural integrity based on a deviation of said plurality of modal parameters from baseline modal parameters for said aerial vehicle.

Said one or more engines may generate lift, thrust and/or steering forces for the aerial vehicle, which in preferred embodiments relates to a rotorcraft, such as a multirotor helicopter (e.g. a quadcopter). The inventors realized that the engine/s of said aerial vehicle can be selectively driven with a driving pattern unsuitable to put or maintain the aerial vehicle in flight, such as due to off-resonant or high driving frequencies, in order to induce vibrational excitations with deterministic oscillation frequencies in the structural components of the aerial vehicle rigidly attached to said engine/s. The skilled person will appreciate that said driving pattern unsuitable to put or maintain the aerial vehicle in flight may be superimposed onto a driving pattern to put or maintain the aerial vehicle in flight, and the vibrational response of the aerial vehicle with and without the driving pattern unsuitable to put or maintain the aerial vehicle in flight may be analyzed in order to determine a deviation of the vibrational response caused by said driving pattern unsuitable to put or maintain the aerial vehicle in flight. However, in preferred embodiments, said driving pattern is applied outside of flight, such that spurious excitations of the aerial vehicle's structure can be minimized thereby inducing a vibrational response at a defined driving frequency.

The vibrational response of at least a part of the aerial vehicle may correspond to characteristic vibration or oscillation modes characteristic for the mechanical structure of a part of the aerial vehicle. The vibrational response may be recorded with a suitable sensor and a frequency analysis of the induced vibrational response may be used to determine modal properties of said recorded vibrational response. Modal properties can describe the dynamic properties of systems in the frequency domain such as modal frequencies, modal masses, modal damping ratios and/or mode shapes of the system and may be derived from a magnitude and/or a phase angle of the vibrational response.

For example, a sensor may record a time-varying signal corresponding to a vibration of at least a part of the aerial vehicle and a frequency domain signal of said vibrational response may be obtained using a Fourier transform of the recorded time-varying signal. Modal parameters may then be derived from the vibrational response, such as by associating a peak location in said Fourier transform with an eigenfrequency of said part of the aerial vehicle and/or using a width (e.g. a FWHM) of said peak as a means to derive a damping factor associated with said part of the aerial vehicle.

Using said determined eigenfrequencies and/or damping factors, the method then comprises classifying a structural integrity of said aerial vehicle based on a deviation of said plurality of modal parameters from baseline modal parameters for said aerial vehicle. Said baseline modal parameters may relate to expected parameters for a given aerial vehicle type based on previous measurements and/or may comprise modal parameters determined during or after production of the aerial vehicle. For example, for a certain aerial vehicle model, baseline structures may be fabricated and their vibrational response may be recorded and analyzed for said selective driving of the one or more engines to obtain a fingerprint of the vibrational response. Said baseline aerial vehicle may then be subjected to targeted wear or damage, to provide baseline modal parameters of a baseline aerial vehicle for different damage categories.

In addition or alternatively, workpiece specific fingerprints may be recorded for each manufactured aerial vehicle as reference modal parameters. Said classifying may then also be based on deviations between the reference modal parameters and the baseline modal parameters for an un-damaged aerial vehicle to account for manufacturing tolerances.

The inventors found that said structural damage or wear induced modifications in the stiffness of associated parts of the investigated aerial vehicles can correlate with eigenfrequency values and/or damping factors determined from peak widths of mechanical resonances identified in the vibrational response obtained by the above described method. As a consequence, the structural integrity of an aerial vehicle may be classified according to the deviation of the recorded modal parameters with respect to the baseline modal parameters.

The inventors also found that the engines are typically located close to strained structural components of the aerial vehicles, such that said classification allows a reliable identification of relevant failure modes. In addition, when selectively driven with said driving pattern unsuitable to maintain or put said aerial vehicle in flight, a vibrational excitation at said driving frequency can be comparatively narrowband and may thereby minimize excitation noise and prevent nonlinear vibrational effects allowing a clearer and more deterministic discrimination between different damage classifications as compared to in-flight monitoring systems relying on broadband vibrational excitations due to the motion of the aerial vehicle. In addition, inadvertent excitation of high frequency vibration modes above a sampling frequency of the sensor and a corresponding distorting signal contribution due to aliasing may be prevented, thereby further increasing the selectivity of the classification. In some embodiments, a duration and/or an amplitude of a vibrational excitation associated with a characteristic driving frequency in the driving pattern is controlled to provide a pre-defined excitation energy at said characteristic driving frequency.

In some embodiments, the duration and/or amplitude of the vibrational excitation associated with said characteristic driving frequency is selected based on a power-dependent selectivity of the classification.

A power dependence of the selectivity of the classification may originate from advantageous effects of the vibrational energy on the classification selectivity due to an increasing signal to noise ratio of the vibrational response with increasing excitation power and an improved modal parameter based determination of structural defects increasing with excitation power due to a detectable nonlinear response of said structural defects to said excitation power. At the same time, a duration of the method may increase with increasing duration and/or amplitude of the vibrational excitation, while a distortion of a mode shape of a natural vibration of the aerial vehicle due to resonant effects may negatively affect the selectivity as a function of power due to a distortion of the determination of the damping characteristics based on a peak shape. An advantageous compromise for the excitation power between classification selectivity and classification duration should therefore be pursued in embodiments.

Said selective driving of the engine/s with said driving pattern unsuitable to maintain or put said aerial vehicle in flight can allow deterministic control over a (variable) distribution of driving power as a function of driving frequency during said driving pattern and may thus allow providing an adaptable and precise classification system.

In preferred embodiments, said aerial vehicle comprises a composite fiber supporting structure, preferably a composite fiber hull part, wherein said classifying of said structural integrity in particular comprises classifying a delamination in said composite fiber supporting structure.

Composite fiber supporting structures can exhibit complex failure modes not associated with pronounced change of the eigenfrequencies of the part which may thus not be immediately detected with commonly employed eigenfrequency comparisons. One of these defects can include a delamination of the composite fiber structure which needs not be accompanied with eigenfrequency changes up to an advanced stage of material failure. However, using the method according to the first aspect, a presence and/or degree of said structural defect may nonetheless be detected based on the modal parameters, in particular based on a damping factor derived from the modal parameters, such as one or more peak widths. Moreover, due to the selective driving of the engine/s according to a driving pattern unsuitable to put or maintain the aerial vehicle in flight, a vibrational excitation energy induced by the engine/s can be deterministically controlled and a peak amplitude in the vibrational response may thus be used as a modal parameter to classify the structural integrity.

In preferred embodiments, the one or more selectively driven engines inducing said vibrational response comprise an electric motor, wherein said driving pattern is characterized, at least in part, by one or more driving voltages applied to said electric motor.

An electric motor can be selectively driven with a well-defined driving pattern, in particular containing high frequency components above a natural response of the propulsion unit of the aerial vehicle, such that said electric motor may be used to generate a deterministic and/or comparatively narrowband vibrational excitation in the aerial vehicle unsuitable to put or maintain the aerial vehicle in flight. Thus, selectively driving an electric motor with said driving pattern may minimize spurious vibrational excitations during evaluating the structural integrity.

In preferred embodiments, said driving pattern comprises at least two time intervals during which it is characterized by at least one characteristic driving frequency, wherein said characteristic driving frequencies in said at least two time intervals are mutually different from each other, said different driving frequencies being in particular chosen from a frequency range between 100 Hz and 100 kHz, preferably between 500 Hz and 100 kHz, most preferably between 1 kHz and 10 kHz.

Temporally separated intervals associated with mutually different driving frequencies may increase a driving amplitude during said driving pattern for said respective driving frequencies and may further increase a selectivity of said classification due to a lower susceptibility to nonlinear effects. For example, said driving pattern may include a swept sine, e.g. a chirp and/or impulses in a predetermined frequency range, wherein said characteristic driving frequencies may in particular correspond to different harmonic driving frequencies of respective natural vibration modes of the aerial vehicle.

In preferred embodiments, the driving pattern comprises a frequency sweep in a predetermined frequency range, said frequency sweep comprising temporally spaced sinusoidal excitations associated with a respective characteristic driving frequency, said characteristic driving frequency increasing or decreasing monotonically with time during said frequency sweep.

In principle, a driving pattern with (frequency swept) sinusoidal excitations can be used to minimize spurious excitation. The skilled person will however appreciate that an advantageous compromise between speed and accuracy of the evaluation may be obtained by increasing a bandwidth of the driving pattern, and that in addition multiplexing may be used to parallelize said evaluation of the structural integrity. Further, for example in multirotor helicopters, e.g. a quadcopter, different engines of the one or more engines may be driven alternatingly and/or with different characteristic driving frequencies to evaluate a structural integrity of different parts of the aerial vehicle sequentially or in parallel.

In some embodiments, said driving pattern is adjusted based on said baseline modal parameters and/or reference modal parameters of the aerial vehicle determined at a production stage for the aerial vehicle, such that in said at least two time intervals, said characteristic driving frequency is associated with an eigenfrequency of the baseline modal parameters and/or an eigenfrequency of the reference modal parameters. For example, the driving pattern may comprise a series of frequency chirps, wherein each chirp may be associated with a respective eigenfrequency of the baseline modal parameters.

Advantageously, a range from which said characteristic driving frequencies in the driving pattern are chosen lies above a natural starting frequency of a propulsion unit of the aerial vehicle to limit spurious vibration. Preferably, said range is selected to be accessible with a sampling rate of inertial sensors incorporated in the aerial vehicle, such as selected from acoustic frequencies in an audible range. Selecting at least one of said driving frequencies from an audible range may further provide an audible feedback to an operator during an execution of a damage detection step.

In preferred embodiments, said vibrational response is recorded using one or more sensors incorporated with the aerial vehicle, in particular an inertial measurement unit of the aerial vehicle and/or a microphone and/or a capacitive sensor and/or a piezoelectric sensor connected to the aerial vehicle.

For example, components of the inertial measurement unit can be used to record said vibrational response of at least a part of the aerial vehicle. Such inertial measurement units are commonly installed in rotorcraft, thereby avoiding the need for additional sensors associated with additional weight. However, in case the inertial measurement unit of the aerial vehicle is vibrationally decoupled from the hull of the aerial vehicle, additional low-weight sensors, such as a piezoelectric sensor and/or a capacitive sensor and/or a microphone may be incorporated in the aerial vehicle, and in particular attached at or close to a strained structural element of the aerial vehicle in order to record the vibrational response.

In principle, said vibrational response may also be recorded with high-precision external sensors, such as a laser vibrometer, for example during a production stage. However, by using sensors incorporated in the aerial vehicle, the structural integrity of the aerial vehicle may be independently evaluated in regular intervals, such as before or during each startup of the aerial vehicle, to detect material defects prior to structural failure, and the need for external measurement devices may be avoided.

In preferred embodiments, classifying said structural integrity comprises classifying said structural integrity with a multivariate analyzer comprising a statistical classifier, in particular one or more of a linear discriminant analyzer, a quadratic discriminant analyzer, a support vector machine and/or a machine learning model and/or a heuristic deviation threshold, to classify said structural integrity based on said plurality of modal parameters and said baseline modal parameters for said aerial vehicle.

The inventors found that a selectivity of said classifying of the structural integrity of the aerial vehicle can be increased with a multivariate analysis as compared to a commonly employed detection of eigenfrequency changes. In particular, a logic and/or an arithmetic combination, such as a linear combination, of a plurality of modal parameters can be used to define a characteristic axis for classifying a part of said aerial vehicle, and a classification of the structural integrity may be based on a function of one or more characteristic axes determined from the modal parameters, such as a threshold function for said one or more axes to implement said multivariate analysis. Preferably, a classification of the structural integrity is based on an arithmetic combination, and most preferably on a linear combination, of a plurality of modal parameters to obtain one or more classification axes, and a classification of the structural integrity is based on a value of said one or more classification axes.

In preferred embodiments, said multivariate analyzer classifies said plurality of modal parameters also based on a measured humidity and/or a measured temperature.

The inventors found that a selectivity of the classification may be improved by also considering a measured humidity and/or a measured temperature which may be attributed to gyrothermal stress of composite fiber components of the aerial vehicle. Said measured humidity and/or said measured temperature may be measured with one or more respective internal sensors of the aerial vehicle and/or values of a measured humidity and/or a measured temperature associated with a current location of the aerial vehicle (e.g. as determined from position sensors of the aerial vehicle) may be received by a communication unit of the aerial vehicle from a measurement station.

In preferred embodiments, the multivariate analyzer comprises a linear discriminant analyzer and the method further comprises obtaining said linear discriminant analyzer by receiving classified baseline modal parameters for a baseline aerial vehicle and determining a projection function and a corresponding classification function for said received classified baseline modal parameters, said projection function including linear combinations of modal parameters to obtain a plurality of axes, and the classification function comprising a corresponding plurality of thresholds for said axes to maximize a selectivity of said linear discriminant analyzer for classifying said structural integrity for the classified baseline modal parameters.

A linear discriminant analyzer can provide several advantages for said classifying of the structural integrity. The linear discriminant analyzer may require a reduced set of baseline (training) modal parameters as compared to machine learning methods. Further, the result of a linear discriminant analysis of the projection function, e.g. a projection tensor, can be intelligible for human operators and can highlight correlations between the modal parameters. In addition, the projection and the classification function may be based on linear algebra and may require low computational power for said classifying, such that said multivariate analyzer may be executed by a processing unit incorporated with the aerial vehicle. Said linear discriminant analyzer may further be adjusted based on reference parameters measured for the aerial vehicle shortly after assembly to take into account manufacturing tolerances.

The skilled person will appreciate that the baseline (training) modal parameters can be obtained for a plurality of baseline aerial vehicles, e.g. baseline structures of the same aerial vehicle model with and/or without a targeted introduction of structural wear or structural damage, and that said baseline (training) modal parameters usually correspond to a dataset of modal parameters for said plurality of baseline aerial vehicles and/or a derivative of said modal parameters of said dataset.

In preferred embodiments, the method comprises recording an initial plurality of reference modal parameters for said aerial vehicle and further comprises adjusting an established baseline classifying function based on a deviation between the initial plurality of reference modal parameters recorded for said aerial vehicle and a plurality of baseline modal parameters of a baseline aerial vehicle.

For example, the method may comprise adjusting the projection tensor to include a transformation derived from a difference between the reference modal parameters and the baseline modal parameters and/or may comprise adjusting the classification function threshold based on the projected axes for the reference modal parameters. Taking into account said reference modal parameters can increase a selectivity of the classifying in the presence of manufacturing tolerances affecting the natural vibrational response of the aerial vehicle.

According to a second aspect, the invention relates to a system for evaluating a structural integrity of an aerial vehicle comprising one or more engines. Said system comprises a controller, a sensor and a processing unit. The controller is configured to selectively drive said engine/s of said aerial vehicle according to a driving pattern unsuitable to put or maintain the aerial vehicle in flight. The sensor is configured to record a vibrational response of at least a part of the aerial vehicle to said selective driving of said engine/s. The processing unit is configured to determine a plurality of modal parameters of said vibrational response, in particular comprising a modal parameter pertaining to an eigenfrequency of said vibrational response and/or a modal parameter pertaining to a damping factor corresponding to said eigenfrequency; and to classify said structural integrity based on a deviation of said plurality of modal parameters from reference modal parameters for said aerial vehicle.

In preferred embodiments, said aerial vehicle comprises a composite fiber supporting structure, preferably a composite fiber hull part, wherein said processing unit is configured to classify a delamination in said composite fiber supporting structure.

In preferred embodiments, the one or more selectively driven engines inducing said vibrational response comprise an electric motor, wherein said driving pattern is characterized, at least in part, by one or more driving voltages applied to said electric motor.

In preferred embodiments, said driving pattern comprises at least two time intervals during which it is characterized by at least one characteristic driving frequency, wherein said characteristic driving frequencies in said at least two time intervals are mutually different from each other, said different driving frequencies being in particular chosen from a frequency range between 100 Hz and 100 kHz, preferably between 500 Hz and 100 kHz, most preferably between 1 kHz and 10 kHz.

In preferred embodiments, said sensor is a sensor incorporated with the aerial vehicle, in particular an inertial measurement unit of the aerial vehicle and/or a microphone and/or a capacitive sensor and/or a piezoelectric sensor connected to the aerial vehicle.

In preferred embodiments, said processing unit implements a multivariate analyzer comprising a statistical classifier, in particular one or more of a linear discriminant analyzer, a quadratic discriminant analyzer, a support vector machine and/or a machine learning model and/or a heuristic deviation threshold, to classify said structural integrity based on said plurality of modal parameters and said baseline modal parameters for said aerial vehicle.

In preferred embodiments, said multivariate analyzer classifies said plurality of modal parameters also based on a measured humidity and/or a measured temperature, wherein the system in particular comprises communication means for receiving said measured humidity and/or said measured temperature and/or comprises sensors for measuring said measured humidity and/or said measured temperature.

In preferred embodiments, the multivariate analyzer comprises a linear discriminant analyzer obtainable or obtained by receiving classified baseline modal parameters for a baseline aerial vehicle and determining a projection function and a corresponding classification function for said received classified baseline modal parameters, said projection function including linear combinations of modal parameters to obtain a plurality of axes, and the classification function comprising a corresponding plurality of thresholds for said axes to maximize a selectivity of said linear discriminant analyzer for classifying said structural integrity for the classified baseline modal parameters.

In preferred embodiments, the system further comprises a storage for parameters of an adjusted baseline classifying function adjusted based on a deviation between an initially recorded plurality of reference modal parameters for the aerial vehicle and the plurality of baseline modal parameters of a baseline aerial vehicle, and the processing unit is configured to classify said structural integrity of the aerial vehicle with said adjusted baseline classifying function.

In some embodiments, the system implements and/or executes the method steps of any one of the embodiments of the method according to the first aspect.

In a third aspect, the invention relates to an aerial vehicle comprising the system according to the second aspect with the controller, the sensor and the processing unit incorporated with the aerial vehicle.

In a fourth aspect, the invention relates to a computer program or computer program product comprising machine readable instructions which when the computer program is executed by a processing unit cause the processing unit to implement a method according to any one of the embodiments of the first aspect and/or to implement and/or to control a system according to any one of the embodiments of the second aspect and/or to control an aerial vehicle according to the third aspect.

The machine readable instructions of the computer program or computer program product may be stored on a non-transitory machine-readable storage medium to be accessed by the processing unit.

DETAILED DESCRIPTION OF EMBODIMENTS

The features and numerous advantages of the method, computer program and system according to the present invention will best be understood from a detailed description of preferred embodiments with reference to the accompanying drawings, in which:

FIG. 1 schematically shows an example of an aerial vehicle;

Figure 1:
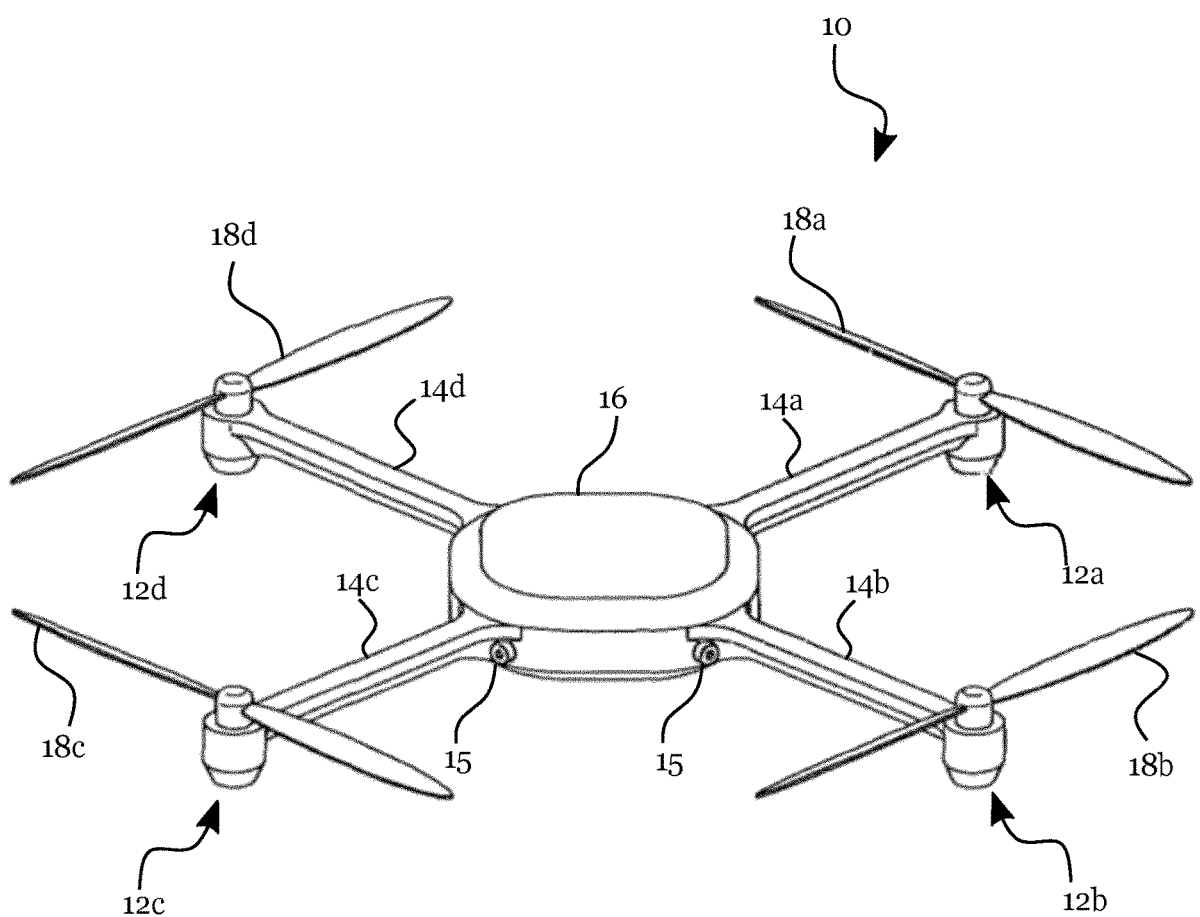

FIG. 1 schematically illustrates an aerial vehicle 10 according to an example of an unmanned multirotor helicopter drone. The aerial vehicle 10 comprises a plurality of engines 12$a$-12$d$, which may be implemented as electric motors, wherein the engines 12$a$-12$d$ are connected via arms 14$a$-14$d$ to a supporting body 16, said arms 14$a$-14$d$ being connected to the supporting body 16 via fasteners 15. Each of the engines 12$a$-12$d$ is connected to a pair of respective rotor blades 18$a$-18$d$ to generate lift, thrust and/or steering forces for the aerial vehicle 10. The supporting body 16 can house a controller (not shown) to generate a driving pattern for driving said engines 12$a$-12$d$, such as by generating driving voltages for one or more electric motors connected to the rotor blades 18$a$-18$d$. For a flight mode of the aerial vehicle 10, said driving pattern can be synchronized between said engines 12$a$-12$d$ and corresponds to a resonant driving of the rotor blades 18$a$-18$d$ in order to accelerate, decelerate and/or maintain a rotational movement of the rotor blades 18$a$-18$d$.

The structure of the aerial vehicle 10, such as the body 16, the arms 14$a$-14$d$ and/or the housings of the engines 12$a$-12$d$, may include composite components, such as composite fiber components, as loadbearing structures. These components may exhibit sufficient rigidity to support the body 16 and the engines 12$a$-12$d$ during flight, but may also be comparatively lightweight to minimize a lifting force required to put the aerial vehicle 10 in flight. However, a structural integrity of the composite components may not be directly accessible via visual inspection of the aerial vehicle 10 outside of severe material failure, e.g. for a delamination of a composite fiber part. Moreover, in the case of small and often unmanned aerial vehicles 10, such as the quadcopter drone schematically illustrated in FIG. 1, common defect monitoring systems may be unsuitable or associated with a disproportionate amount of additional weight and/or volume and are therefore seldom applied in practice.

The invention can address these shortcomings with a structural integrity evaluating strategy having limited or no impact on the complexity and/or weight of the aerial vehicle 10.

Figure 2:
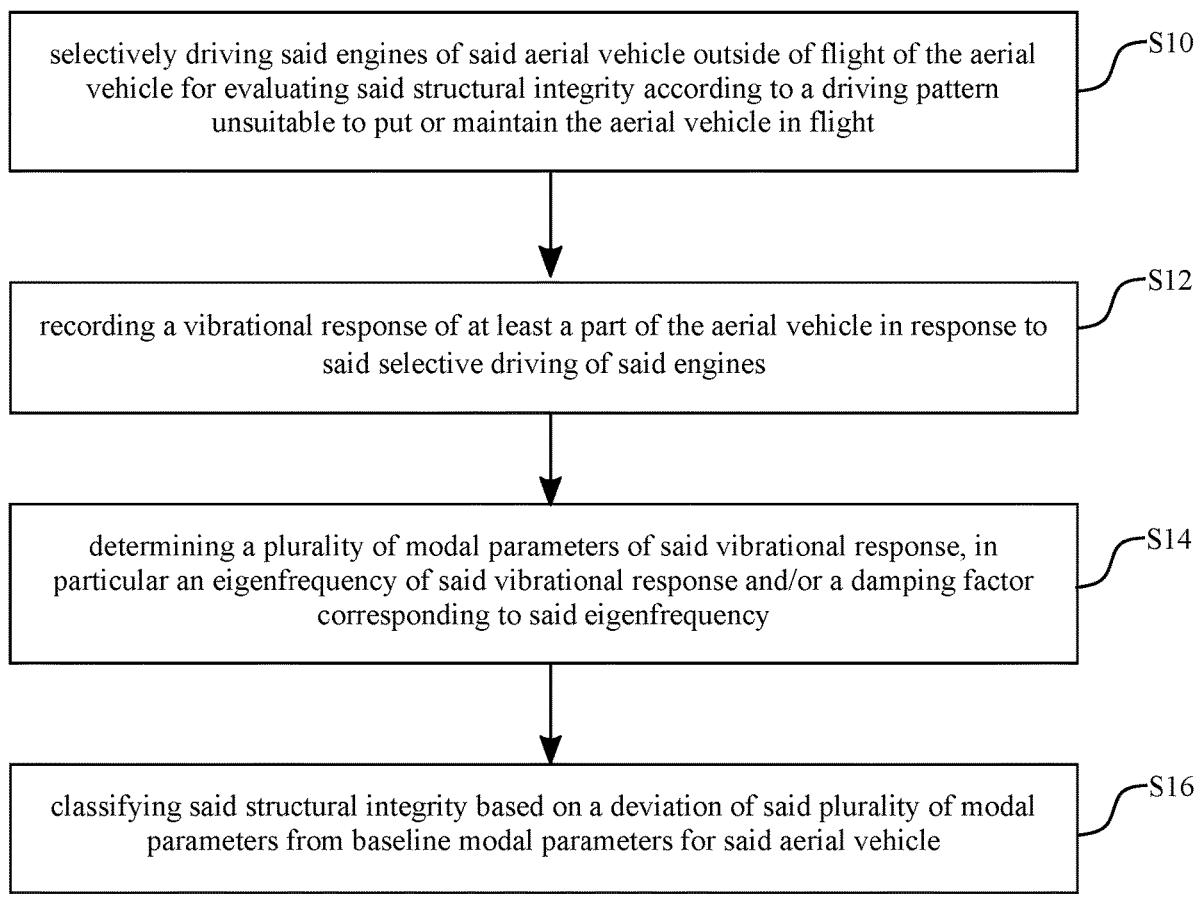
FIG. 2 illustrates a flowchart of a method of evaluating a structural integrity of an aerial vehicle according to an example.

FIG. 2 schematically illustrates a method for evaluating the structural integrity according to an example. The method comprises selectively driving said engines 12a-12d of said aerial vehicle 10 according to a driving pattern unsuitable to put or maintain the aerial vehicle 10 in flight (step S10). The method further comprises recording a vibrational response of at least a part of the aerial vehicle 10 to said selective driving of said engines 12a-12d (step S12) and determining a plurality of modal parameters of said vibrational response, in particular an eigenfrequency of said vibrational response and/or a damping factor corresponding to said eigenfrequency (step S14). The method then comprises classifying said structural integrity based on a deviation of said plurality of modal parameters from baseline modal parameters for said aerial vehicle 10 (step S16).

Thus, the method depicted in FIG. 2 does not require additional actuators incorporated with the aerial vehicle 10, but can achieve a defined actuation with a selective driving of the already available engines 12a-12d of the aerial vehicle 10 outside of flight. A system for evaluating the structural integrity may hence be incorporated with the aerial vehicle 10 with limited impact on the weight of the aerial vehicle 10.

Figure 3:
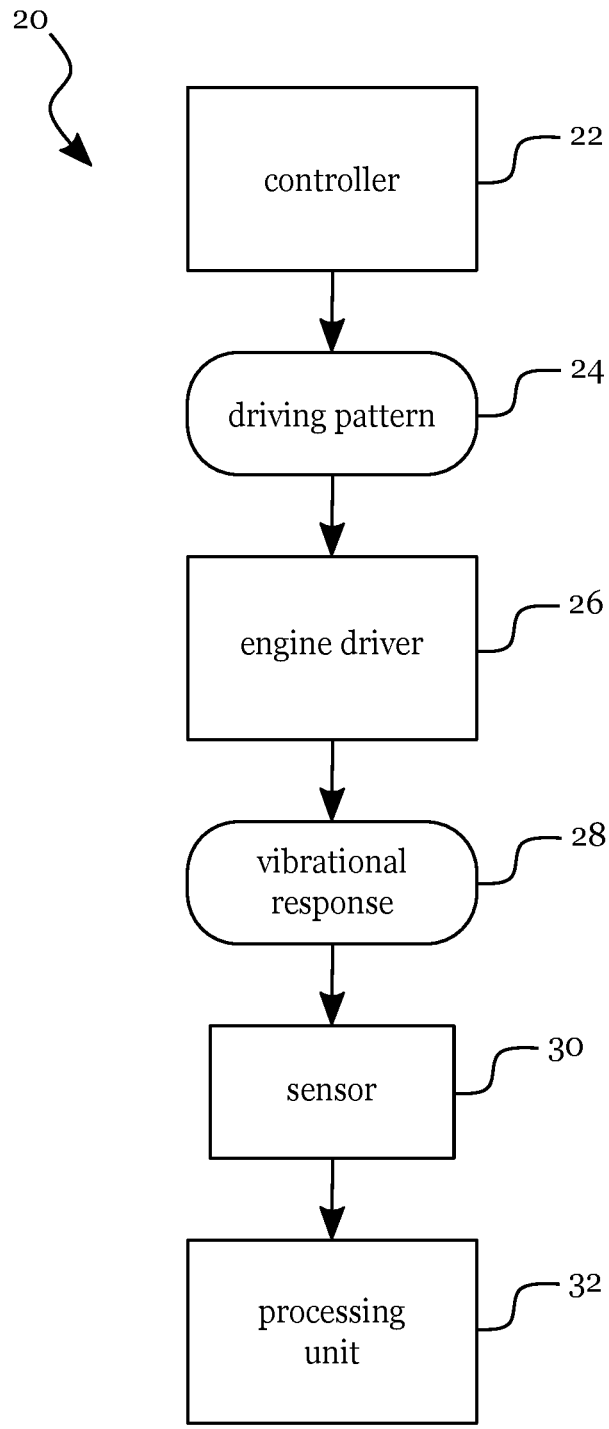
FIG. 3 illustrates a schematic diagram of a system for evaluating a structural integrity of an aerial vehicle according to an example.

FIG. 3 schematically illustrates a system 20 for implementing said method and for evaluating a structural integrity of an aerial vehicle 10 according to an example. The system 20 comprises a controller 22 configured to generate a driving pattern 24 which can be used in an engine driver 26 of the one or more engines 12a-12d of the aerial vehicle 10. Based on the mechanical coupling between the one or more engines 12a-12d and the structure of the aerial vehicle 10, said driving pattern 24 can then induce a vibrational response 28 of at least a part of the aerial vehicle 10, which can be recorded with a sensor 30. A processing unit 32 may then receive and/or analyze the recorded vibrational response 28 to infer modal parameters from the vibrational response 28, such as a characteristic eigenfrequency and/or a damping characteristic associated with a natural vibration of at least a part of the aerial vehicle 10.

Based on the modal parameters, the system 20 may then evaluate whether a material failure is present based on a comparison between the modal parameters and baseline modal parameters which may be pre-determined for said aerial vehicle 10.

In order to maximize a selectivity of said evaluation of the structural integrity by the system 20, it can be advantageous to avoid spurious vibrational excitation of the aerial vehicle 10, which can for example occur during flight. Consequently, said driving pattern 24 should be chosen to be unsuitable to put or maintain the aerial vehicle 10 in flight and may in particular be chosen to prevent resonant excitation of the propulsion unit, such as the rotor blades 18a-18d. For example, the one or more engines 12a-12d may be driven with a driving pattern 24 containing sinusoidal voltage signals with different characteristic driving frequencies during different time intervals of the driving pattern 24, e.g. a frequency swept sine driving signal, wherein said characteristic driving frequencies in said different time intervals can be chosen from a frequency range between 1 kHz and 4 kHz and may not lead to a resonant rotational excitation of the rotor blades 18a-18d, but may nonetheless be accessible to internal sensors 30 of the aerial vehicle 10, such as an inertial measurement unit of the aerial vehicle 10.

Further, frequencies of a driving signal may be selected from an audible frequency range to provide an audible feedback to an operator.

The driving pattern 24 may be adjusted to contain driving intervals associated with driving frequencies in the vicinity of known eigenfrequencies of natural vibrations of the aerial vehicle 10. For example, said driving pattern 24 may contain swept sine driving signals, wherein a frequency is swept in the range of a given multiple of a known peak width associated with the natural vibration at said eigenfrequency. In the case of an aerial vehicle 10 with a plurality of engines 12a-12d, the engines 12a-12d may be concurrently and/or sequentially driven with different or shifted driving patterns 24 in order to concurrently evaluate a structural integrity of different parts of the aerial vehicle 10. For example, the different engines 12a-12d of a multirotor aerial vehicle 10 as shown in FIG. 1 may be driven selectively to systematically evaluate a structural integrity of the respective arms 14a-14d mechanically connecting said engines 12a-12d to the body 16. The driving pattern 24 for an engine 12a-12d may also comprise a multiplexed driving pattern 24, including at least two simultaneously applied driving patterns 24 associated with different respective characteristic driving frequencies in order to parallelize at least parts of said evaluation of the structural integrity.

Said driving pattern 24 can induce an excitation of natural vibrations of at least a part of the aerial vehicle 10 due to a driven oscillation of engine parts, such as the rotor of an electric motor. The natural vibrations can then be detected as a time varying displacement of the part with the sensor 30 as the vibrational response 28.

In principle, measurements of inertial sensors 30 of the aerial vehicle 10, such as an inertial measurement unit commonly incorporated with aerial vehicles 10 for the control of the orientation of the aerial vehicle 10, e.g. an accelerometer or a gyrometer, can be used to record the vibrational response 28. However, since the inertial measurement unit of unmanned aerial vehicles 10 is often vibrationally decoupled from the hull structure of the aerial vehicle 10, additional lightweight sensors 30 may be incorporated with the aerial vehicle 10 to detect the vibrational response 28. Examples of lightweight sensors 30 for the detection of the vibrational response 28 include microphones and capacitive and/or piezoelectric vibration sensors attached to a component of the aerial vehicle 10. During an inline manufacturing process or routine inspection of the aerial vehicle 10, external sensors 30 may further be used, such as a laser vibrometer.

The recorded vibrational response 28 may be transformed into the frequency domain by the processing unit 32, such as by performing a Fourier transform of the recorded vibrational response 28 to perform a modal analysis and to extract modal parameters, such as eigenfrequencies and/or associated damping factors associated with peaks in a frequency spectrum of the vibrational response 28. In some embodiments, the processing unit 32 configured for determining the modal parameters from the recorded vibrational response 28 is incorporated with the aerial vehicle 10. However, the recorded vibrational response 28 and/or the modal parameters may also be transmitted by a communication unit of the aerial vehicle 10 to an external processing unit 32 in order to analyze and/or classify the modal parameters.

Figure 4A:
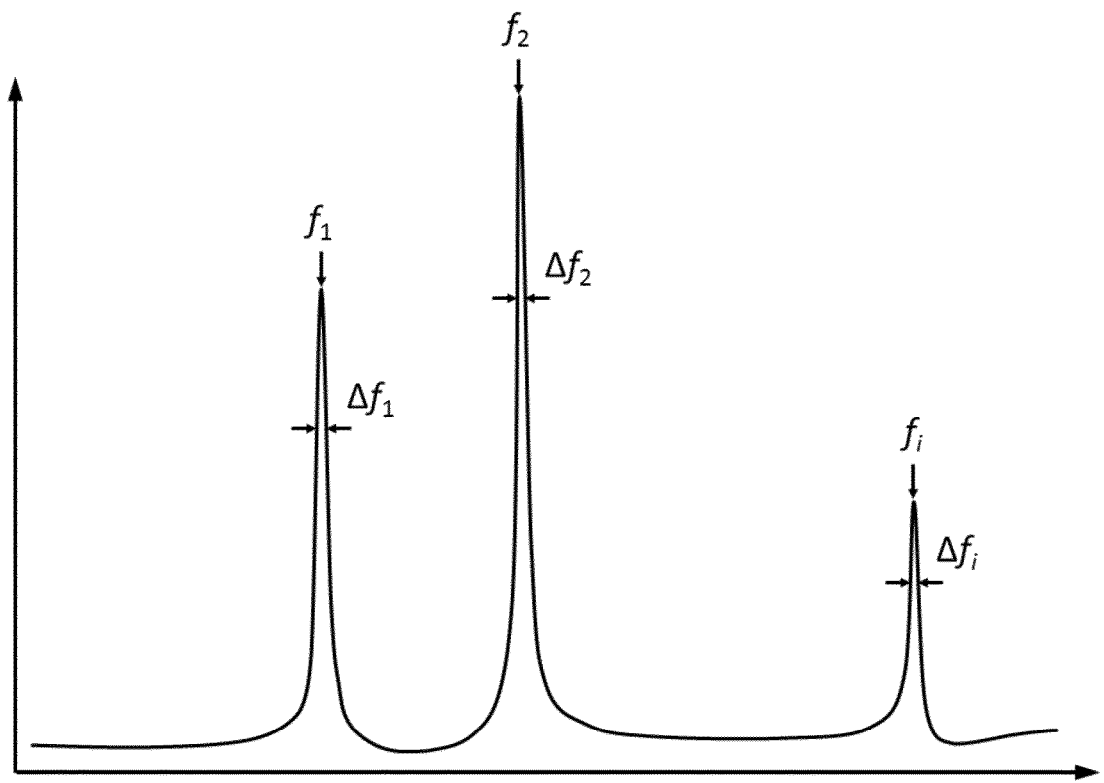
FIG. 4A shows a schematic vibrational response of an aerial vehicle in the frequency domain according to an example.

FIG. 4A illustrates a schematic example of a frequency spectrum of a vibrational response 28 of the aerial vehicle 10 obtainable via a Fourier transform of the time-dependent vibrational response 28 recorded with a sensor 30. In the diagram, the frequency varies along the horizontal x-axis and the vertical y-axis shows the corresponding amplitude of the Fourier transform. The exemplary frequency spectrum exhibits a plurality of peaks at different frequency values indicating natural vibrations of parts of the aerial vehicle 10 with a corresponding natural oscillation frequency. Vertical arrows highlight peak positions $f_1$-$f_i$ while horizontal arrows indicate peak widths $\Delta f_1$-$\Delta f_i$. Peak detection and/or fitting functions may be employed in non-idealized spectrums to detect and to assess the modal parameters of the vibrational response 28.

Figure 4B:
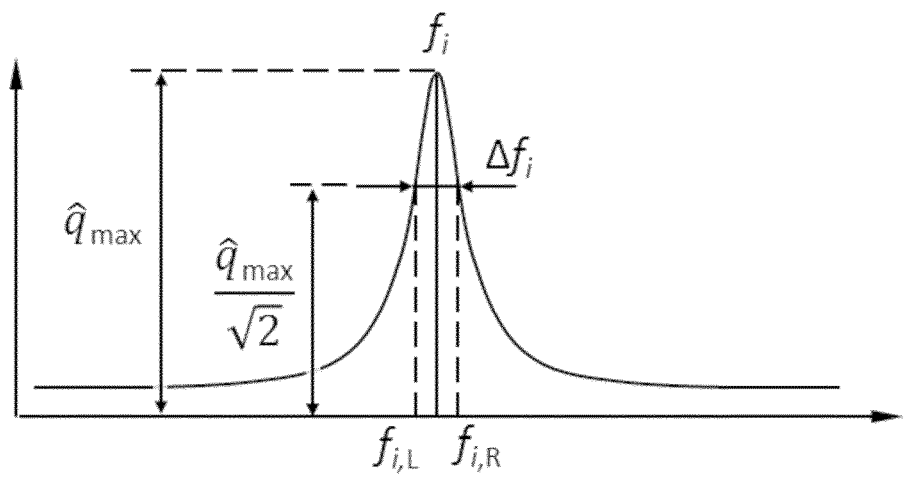
FIG. 4B illustrates a determination of a peak width from a schematic vibrational response of an aerial vehicle in the frequency domain according to an example.

FIG. 4B illustrates an example of a natural vibration peak $f_i$ in a frequency domain spectrum of the vibrational response 28 for the determination of a modal parameter of a natural vibration peak width associated with a damping characteristic. Said natural vibration peak $f_i$ can be associated with a characteristic frequency, such as a frequency associated with a maximum amplitude at or close to the peak position $q_{max}$, a center frequency and/or a characteristic frequency of a fitting function applied to said natural vibration peak $f_i$. A peak width $\Delta f_i$ (full width at half maximum, FWHM) may then be determined from a frequency difference of left $f_{i,L}$ and right frequency positions $f_{i,R}$ associated with $1/\sqrt{2}$ of the maximum amplitude $q_{max}$. A damping ratio $D_i$ as a modal parameter associated with a mode i may then be determined according to:

$$D_i = \frac{f_{i,R} - f_{i,L}}{2f_i} = \frac{\Delta f_i}{2f_i}$$

In internal tests performed by the inventors, the damping ratio as determined from a peak width in the frequency domain spectrum of the vibrational response 28 showed good correlation with delamination defects in composite fiber hull parts of an aerial vehicle 10. However, a damping parameter may also be determined as a function of the damping ratio $D_i$ and the amplitude $q_{max}$ of a mode, e.g. a ratio of the damping ratio $D_i$ and the amplitude $q_{max}$ of a mode. A selectivity of a damage classification system 20 was found to be improved by a multivariate analysis of a plurality of modal parameters and was also found to be improved by additionally considering external test parameters, in particular humidity and temperature, over simple eigenfrequency comparison techniques. However, defects and/or maintenance requirements of joints and/or fasteners in the aerial vehicle 10 may equally be detected with the method illustrated above.

A suitable multivariate analysis method for this field of application was found to be linear discriminant analysis. According to said method, parameters may be classified according to predetermined damage classes based on linear combinations of the modal parameters. The method can include a projection function and a corresponding classification function for maximizing the selectivity of the method.

The projection function is usually associated with a projection tensor (matrix) with a set of constants specifying a plurality of linear combinations of the input parameters to project said input parameters onto a set of classification axes. In the present case, the projection function can include constants for a plurality of linear combinations of the modal parameters which are used to obtain a corresponding plurality of classification axes.

The classification function may then be a function which, based on these classification axes, classifies input modal parameters into different damage classes, such as different damaged parts and/or grades of failure. For example, the classification function may provide one or more thresholds for said classification axes associated with respective damage classes.

In a training phase, the linear discriminant analyzer can be trained to maximize a selectivity of the evaluation of the structural integrity based on pre-classified baseline modal parameters. The training/determination of the linear discriminant analyzer may include statistically determining constants of the linear combinations of the projection function and corresponding thresholds of the classification function in order to maximize a selectivity criterion.

The baseline modal parameters may be obtained by subjecting defect-free baseline aerial vehicles for a given aerial vehicle type to a driving pattern 24 and by recording the modal parameters for said baseline aerial vehicles. In some embodiments, the baseline aerial vehicles can further be subjected to external forces in order to induce potential or common structural defects of the given aerial vehicle type, and a vibrational response 28 when the damaged aerial vehicles are subjected to the driving pattern 24 may also be recorded as classified baseline modal parameters associated with a defined damage class for the determination of the linear discriminant analyzer.

The use of a linear discriminant analyzer or a similar multivariate analyzer based on linear parameter relationships can have the advantage of a reduced size of a training parameter set for obtaining a pre-defined selectivity of the multivariate analyzer and can have a low computational footprint as compared to more complex classifying algorithms, such as neural networks.

In addition, the linear discriminant analyzer is associated with intelligible calculation instructions thereby allowing adjusting of the parameters of the multivariate analyzer based on reference modal parameters for an individualized aerial vehicle 10, i.e. a "fingerprint" of the vibrational response 28 of the aerial vehicle 10 to a driving pattern 24. For example, for each finished workpiece, reference modal parameters may be recorded at or shortly after completion of manufacturing and may be used to shift the projection function and/or classification thresholds according to a deviation between the reference modal parameters and the baseline modal parameters. In this way, an adjusted multivariate analyzer based on the reference modal parameters can be used to account for manufacturing tolerances affecting the modal parameters of the un-damaged aerial vehicle 10. Said reference modal parameters and/or modal parameters recorded for a damaged aerial vehicle 10 may also be used to further improve a selectivity of the multivariate analyzer.

However, simpler classification functions, such as predetermined thresholds for the modal parameters, or more complex classification functions, such as a neural network trained to evaluate a structural integrity of an aerial vehicle 10 based on the vibrational response 28, may equally be used to perform the method according to FIG. 2 and to evaluate said structural integrity.

Advantageously, the multivariate analyzer is configured to include test parameters as part of the multivariate analysis, such as the humidity and/or temperature at the time of the evaluation of the structural integrity of the aerial vehicle 10. Humidity and/or temperature sensors 30 may be incorporated with the aerial vehicle 10 in order to directly measure humidity values and/or temperature values at the current position of the aerial vehicle 10. However, in some embodiments, values of the humidity and/or of the temperature may also be received by the processing unit 32 from external sensors 30 for said evaluation, e.g. in case no temperature sensor and/or humidity sensor is incorporated with the aerial vehicle 10.

The skilled person will appreciate that the determination of the modal parameters and the classification of the recorded vibrational response 28 need not be performed by a processing unit 32 incorporated with the aerial vehicle 10, but may also be determined by an external processing unit 32 in communication with the aerial vehicle 10. Further, while the use of internal sensors 30 of the aerial vehicle 10 in order to record the vibrational response 28 may be preferred, external sensors 30 not incorporated with the aerial vehicle 10 may equally be employed to evaluate the structural integrity of the aerial vehicle 10, e.g. during routine inspection of the aerial vehicle 10. Further, while reference was made to characteristic frequencies in the preceding description, the skilled person will appreciate that the driving pattern 24 may contain multiple frequencies in practice and additional frequencies may be introduced due to non-idealized behavior of the control loop, e.g. a finite bandwidth of an element in the control loop, or due to physical characteristics of the structure of the aerial vehicle 10. The term "characteristic (driving) frequency" should therefore be construed broadly as a frequency characterizing a driving pattern 24, such as the frequency for which a driving amplitude of the driving pattern 24 is maximal.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS

10 aerial vehicle
12*a*-12*d* engines
14*a*-14*d* arms
15 fastener
16 body
18*a*-18*d* rotor blades
20 system
22 controller
24 driving pattern
26 engine driver
28 vibrational response
30 sensor
32 processing unit

The invention claimed is:

1. A method of evaluating a structural integrity of an aerial vehicle comprising one or more engines, said method comprising:
  selectively driving said one or more engines of said serial vehicle according to a driving pattern unsuitable to put or maintain the aerial vehicle in flight, wherein the driving pattern comprises one or both of a temporally varied driving pattern, comprising at least two time intervals during which it is characterized be at least one characteristics driving frequency, wherein said characteristic driving frequencies in said at least two time intervals are mutually different from each other, and a multiplexed driving pattern, comprising at least two simultaneously applied driving patterns associated with different respective characteristic driving frequencies;
  recording a vibrational response of at least a part of the aerial vehicle to said selective driving of said one or more engines;
  determining a plurality of modal parameters of said vibrational response; and
  classifying said structural integrity based on a deviation of said plurality of modal parameters from baseline modal parameters for said aerial vehicle.

2. The method of claim 1, wherein said aerial vehicle comprises a composite fiber supporting structure, and wherein said classifying of said structural integrity comprises classifying a delamination in said composite fiber supporting structure.

3. The method of claim 1, wherein the one or more selectively driven engines inducing said vibrational response comprise an electric motor, and wherein said driving pattern is characterized, at least in part, by one ore driving voltages applied to said electric motor.

4. The method of claim 1, wherein said vibrational response is recorded using one or mom sensors incorporated with the aerial vehicle.

5. The method of claim 1, wherein classifying said structural integrity comprises classifying said structural integrity with a multivariate analyzer comprising a statistical classifier to classify said structural integrity based on said plurality of modal parameters and said baseline modal parameters for said aerial vehicle.

6. The method of claim 5, wherein said multivariate analyzer classifies said plurality of modal parameters also based on a measured humidity or a measured temperature.

7. The method of claim 5, wherein the multivariate analyzer comprises a linear discriminant analyzer and the method further comprises obtaining said linear discriminant analyzer by receiving classified baseline modal parameters for a baseline aerial vehicle and determining a projection function and a corresponding classification faction for said received classified baseline modal parameters, said projection function including linear combinations of modal parameters to obtain a plurality of axes, and the classification function comprising a corresponding plurality of thresholds for said as to maximize a selectivity of said linear discriminant analyzer for classifying said structural integrity for the classified baseline modal parameters.

8. The method of claim 1, wherein the method comprises recording a initial plurality of reference modal parameters for said aerial vehicle and further comprises adjusting a established baseline classifying faction based on a deviation between the initial plurality of reference modal parameters recorded for said aerial vehicle and a plurality of baseline modal parameters of a baseline aerial vehicle.

9. A system for evaluating a structural integrity of a aerial vehicle comprising one or more engines, said system comprising:
  a controller configured to selectively drive said one or mom engines of said aerial vehicle according to a driving patter unsuitable to put or maintain the aerial vehicle in flight, wherein the driving pattern comprises one or both of a temporally varied driving pattern, comprising at least two time intervals during which it is characterized by at least one characteristic driving frequency, wherein said characteristic driving frequencies in said at least two time intervals are mutually different from each other, and a multiplexed driving pattern, comprising at least two simultaneously applied driving patterns associated with different respective characteristic driving frequencies;
  a sensor configured to record a vibrational response of at least a part of the aerial vehicle to said selective driving of said one or more engines;
  a processing unit configured to determine a plurality of modal parameters of said vibrational response; and classify said structural integrity based on a deviation of said plurality of modal parameters from reference modal parameters for said aerial vehicle.

10. The system of claim 9, wherein said aerial vehicle comprises a composite fiber supporting structure, and wherein said processing unit is configured to classify a delamination in said composite fiber supporting structure.

11. The system of claim 9, wherein the one or more selectively driven engines inducing said vibrational response comprise electric motor, and wherein said driving pattern is characterized, at least in part, by one or more driving voltages applied to said electric motor.

12. The system of claim 9, wherein said senor is a sensor incorporated with the aerial vehicle.

13. The system of claim 9, wherein said processing unit implements a multivariate analyzer comprising a statistical classifier to classify said structural integrity based on said plurality of modal parameters and said baseline modal parameters for said aerial vehicle.

14. The system of claim 13, wherein said multivariate analyzer classifies said plurality of modal parameters also based on a measured humidity or a measured temperature.

15. The system of claim 13, wherein the multivariate analyzer comprises a linear discriminant analyzer obtained by receiving classified baseline modal parameters for a baseline aerial vehicle and determining a projection function and a corresponding classification function for said received classified baseline modal parameters, said projection function including linear combinations of modal parameters to obtain a plurality of axes, and the classification function comprising a corresponding plurality of thresholds for said axes to maximize a selectivity of said linear discriminant analyzer for classifying said structural integrity for the classified baseline modal parameters.

16. The system of claim 9, further comprising a storage for parameters of a adjusted baseline classifying faction adjusted based on a deviation between an initially recorded plurality of reference modal parameters for the aerial vehicle and the plurality of baseline modal parameters of a baseline aerial vehicle, and the processing unit is configured to classify said structural integrity of the aerial vehicle with said adjusted baseline classifying faction.

17. The system of claim 9, with the controller, the sensor and the processing unit incorporated with the aerial vehicle.

18. A non-transitory computer-readable medium storing machine readable instructions which when executed by a processing unit cause the processing unit to implement a method with the steps of:

selectively driving one or mom engines of aerial vehicle according to a driving pattern unsuitable to put or maintain the aerial vehicle in flight, wherein the driving pattern comprises one or both of a temporally varied driving pattern, comprising at least two time intervals during which it is characterized by at least one characteristic driving frequency, wherein said characteristic driving frequencies in said at least two time intervals are mutually different from each other, and a multiplexed driving pattern, comprising at least two simultaneously applied driving patterns associated with different respective characteristic driving frequencies;

recording a vibrational response of at least a part of the aerial vehicle to said selective driving of said one or more engines;

determining a plurality of modal parameters of said vibrational response; and classifying a structural integrity of the aerial vehicle based on a deviation of said plurality of modal parameters from baseline modal parameters for said aerial vehicle.

* * * * *